(12) United States Patent
Barrett et al.

(10) Patent No.: US 8,804,960 B2
(45) Date of Patent: Aug. 12, 2014

(54) IMPLEMENTING KNOWN SCRAMBLING RELATIONSHIP AMONG MULTIPLE SERIAL LINKS

(75) Inventors: Wayne Melvin Barrett, Rochester, MN (US); Kenneth Michael Valk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 908 days.

(21) Appl. No.: 12/709,662

(22) Filed: Feb. 22, 2010

(65) Prior Publication Data

US 2011/0208954 A1    Aug. 25, 2011

(51) Int. Cl.
*H04L 9/12*     (2006.01)
*H04L 29/06*    (2006.01)
*G06F 13/00*    (2006.01)

(52) U.S. Cl.
CPC .......... *H04L 63/0457* (2013.01); *G05Q 20/341* (2013.01); *G06F 13/00* (2013.01); *H04L 2209/12* (2013.01)
USPC ............................... 380/268; 380/262; 713/2

(58) Field of Classification Search
CPC .......... H04L 63/0457; H04L 2209/12; G06Q 20/341; G06F 13/00
USPC ........................ 713/2, 189, 400; 380/268, 262
See application file for complete search history.

(56) References Cited

U.S. PATENT DOCUMENTS

| | | | |
|---|---|---|---|
| 5,237,593 A | 8/1993 | Fisher et al. | |
| 7,010,607 B1 | 3/2006 | Bunton | |
| 7,444,558 B2 | 10/2008 | Mitbander et al. | |
| 7,492,807 B1 | 2/2009 | Buchmann et al. | |
| 7,711,878 B2 | 5/2010 | Cherukuri et al. | |
| 7,769,048 B2 | 8/2010 | Sharma | |
| 2005/0262184 A1 | 11/2005 | Cherukuri et al. | |
| 2005/0286567 A1 | 12/2005 | Cherukuri et al. | |
| 2008/0260082 A1 | 10/2008 | Panikkar et al. | |
| 2008/0276011 A1* | 11/2008 | Bircher et al. | 710/8 |
| 2009/0034728 A1 | 2/2009 | Goergen et al. | |
| 2009/0252326 A1* | 10/2009 | Buchmann et al. | 380/268 |
| 2009/0323722 A1* | 12/2009 | Sharma | 370/470 |
| 2010/0008460 A1 | 1/2010 | Zhang et al. | |

OTHER PUBLICATIONS

"High Speed Serdes Devices and Applications" by David Robert Stauffer et al., 1st edition Oct. 23, 2008; Sec. 5.3.5, pp. 213-218, http://books.google.com/books?id=Cx3r0H-4AhEC&pg=PA213&lpg=PA213&focus=viewport&dg=prbs+%22training+pattern%25#v=onepage&g&f=false.
Backplane Ethernet Specification http://grouper.ieee.org/groups/802/3/ap/public/sep05/abler_01_0905.pdf.
HyperTransport I/O Link Specification Revision 3.00 Apr. 21, 2006; Section 2.2 Gen3 Scrambling, pp. 43-45.

* cited by examiner

*Primary Examiner* — Jung Kim
*Assistant Examiner* — Ayoub Alata
(74) *Attorney, Agent, or Firm* — Joan Pennington (57) ABSTRACT

A method and circuit for implementing known scrambling relationship among multiple serial links, and a design structure on which the subject circuit resides are provided. A transmit Linear Feedback Shift Register (LFSR) is provided with each of the multiple serial links for scrambling transmitted data. A receive Linear Feedback Shift Register (LFSR) is provided with each of the multiple serial links for descrambling received data. Each of the transmit LFSRs is initialized to a unique value. Each transmit LFSR conveys a current unique value to a receive LFSR for synchronizing the transmit LFSR and receive LFSR to begin scrambling and descrambling data.

11 Claims, 9 Drawing Sheets

IMPLEMENTING KNOWN SCRAMBLING RELATIONSHIP AMONG MULTIPLE SERIAL LINKS

FIELD OF THE INVENTION

The present invention relates generally to the data processing field, and more particularly, relates to a method and circuit for implementing known scrambling relationship among multiple serial links, and a design structure on which the subject circuit resides.

DESCRIPTION OF THE RELATED ART

High speed serial (HSS) links are used for communications in various known computer chips and computer systems. A given computer chip may include multiple instances of a specific HSS link using the same interface protocol. Many HSS interfaces utilize Linear Feedback Shift Registers (LFSRs) to scramble the data that is transmitted. This scrambling provides many advantages; however, synchronization is required to accurately de-scramble the received data bit stream.

Each serial link protocol generally provides its own unique mechanism for achieving such synchronization. In conventional arrangements, typically both the transmit LFSR and the receive LFSR are initialized to a predefined starting value based upon when a given stage of an overall Link Initialization Procedure (LIP) takes place.

In a computer chip having multiple HSS link interfaces, it would be preferable to avoid the situation of some conventional arrangements where multiple transmit LFSRs are initialized to their starting value, and then multiple HSS interfaces are scrambling their IDLE patterns in the exact same way at the exact same time. In prior art arrangements, both the transmit LFSR and the receive LFSR can be initialized to a common predefined value, such as all ones. When all links are transmitting using the same LFSR value, then the electromagnetic interference (EMI) radiation of each link may add together producing stronger interference.

A need exists for an effective method and circuit to guarantee that for each HSS link interface, the scrambling LFSR has a different value during normal operation than the scrambling LFSR of each of the multiple other serial links. Such method and circuit are needed so that their IDLE patterns will be different from one another and adding of the EMI radiation of each link is substantially avoided.

SUMMARY OF THE INVENTION

Principal aspects of the present invention are to provide a method and circuits for implementing known scrambling relationship among multiple serial links, and a design structure on which the subject circuit resides. Other important aspects of the present invention are to provide such method, circuitry, and design structure substantially without negative effect and that overcome many of the disadvantages of prior art arrangements.

In brief, a method and circuits for implementing known scrambling relationship among multiple serial links, and a design structure on which the subject circuit resides are provided. A transmit Linear Feedback Shift Register (LFSR) is provided with each of the multiple serial links for scrambling transmitted data. A receive Linear Feedback Shift Register (LFSR) is provided with each of the multiple serial links for descrambling received data. Each of the transmit LFSRs is initialized to a unique value. Each transmit LFSR conveys a current unique value to a receive LFSR, for synchronizing the transmit LFSR and receive LFSR to begin scrambling and descrambling data.

In accordance with features of the invention, a multiple-path local rack interconnect system includes a plurality of interconnect chips, and a plurality of serial links connected between each of the plurality of interconnect chips. Each of the interconnect chips includes a plurality of link interfaces for implementing known scrambling relationship among multiple serial links of the plurality of serial links. Each link interface is connected to a respective one of the multiple serial links. Each link interface includes a transmit Linear Feedback Shift Register (LFSR) for scrambling transmitted data; and a receive Linear Feedback Shift Register (LFSR) for descrambling transmitted data. Each transmit LFSR is initialized with a unique value; and conveys a current unique value to a receive LFSR for synchronizing the transmit LFSR and receive LFSR to begin scrambling and descrambling data.

In accordance with features of the invention, the unique value is based upon an interface number of each said transmit LFSR. Each of the transmit LFSRs is initialized to a unique value during power-on, and continues running for the life of the power-on. Each transmit LFSR conveys a current unique value to a receive LFSR for synchronizing the transmit LFSR and receive LFSR during a link training sequence.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, circuits and methods are provided for implementing known scrambling relationship among multiple serial links. The methods and circuits of the invention guarantee that the scrambling Linear Feedback Shift Register (LFSR) of each high speed serial (HSS) link interface have a different value during normal operation; therefore their IDLE patterns will be different from one another so that the electromagnetic interference (EMI) radiation of each link will not add. In conventional arrangements, typically EMI radiation of each link adds together producing stronger interference, for example, where LFSRs of multiple HSS link interfaces are initialized with the same value.

Figure 1A:
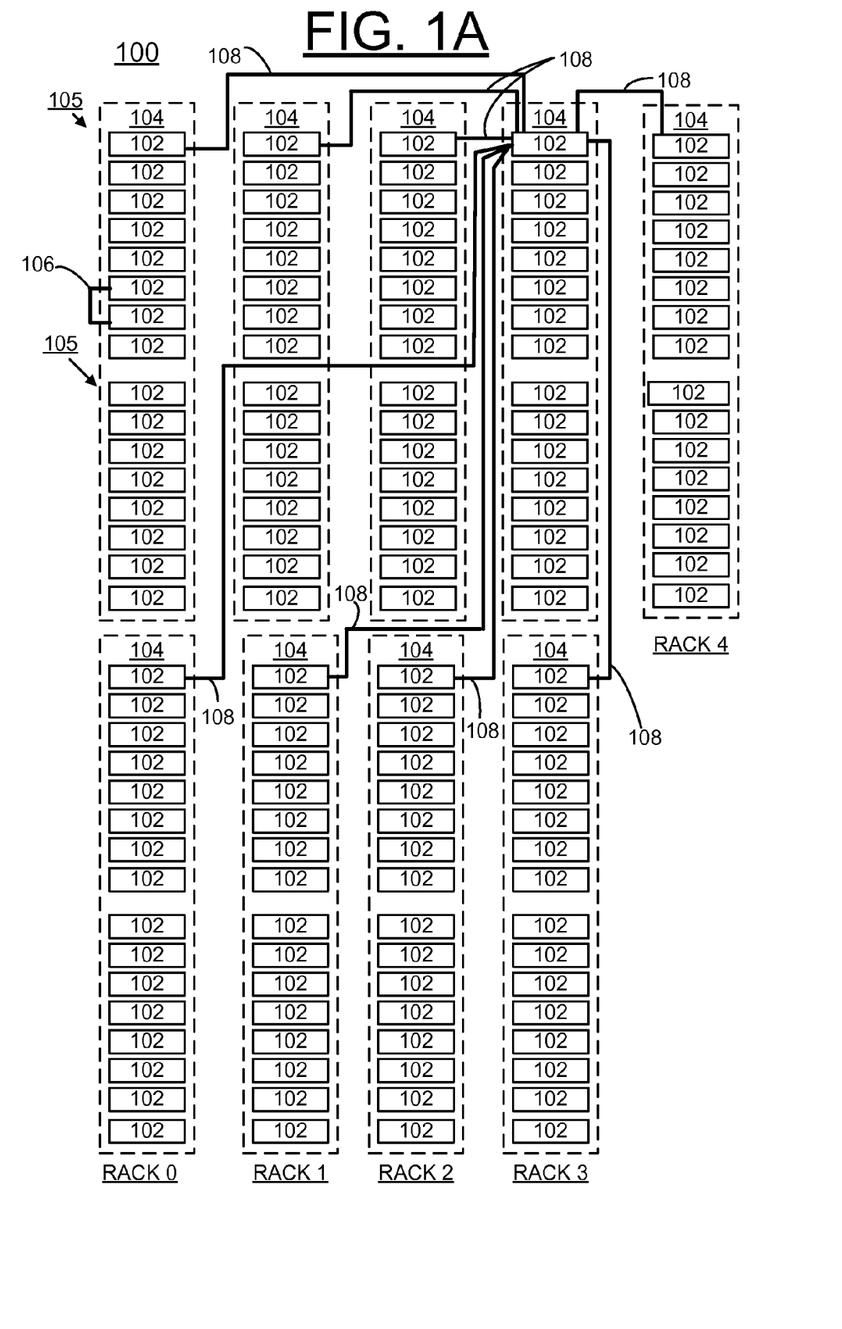
FIGS. 1A, 1B, 1C, 1D, and 1E are respective schematic and block diagrams illustrating an exemplary a local rack interconnect system for implementing known scrambling relationship among multiple serial links in accordance with the preferred embodiment.

Having reference now to the drawings, in FIG. 1A, there is shown an example multiple-path local rack interconnect system generally designated by the reference character 100 used for implementing known scrambling relationship among multiple serial links in accordance with the preferred embodiment. The multiple-path local rack interconnect system 100 supports computer system communications between multiple servers, and enables an Input/Output (IO) adapter to be shared across multiple servers. The multiple-path local rack interconnect system 100 supports network, storage, clustering and Peripheral Component Interconnect Express (PCIe) data traffic.

The multiple-path local rack interconnect system 100 includes a plurality of interconnect chips 102 in accordance with the preferred embodiment arranged in groups or super nodes 104. Each super node 104 includes a predefined number of interconnect chips 102, such as 16 interconnect chips, arranged as a chassis pair including a first and a second chassis group 105, each including 8 interconnect chips 102. The multiple-path local rack interconnect system 100 includes, for example, a predefined maximum number of nine super nodes 104. As shown, a pair of super nodes 104 are provided within four racks or racks 0-3, and a ninth super node 104 is provided within the fourth rack or rack 4.

In FIG. 1A, the multiple-path local rack interconnect system 100 is shown in simplified form sufficient for understanding the invention, with one of a plurality of local links (L-links) 106 shown between a pair of the interconnect chips 102 within one super node 104. The multiple-path local rack interconnect system 100 includes a plurality of L-links 106 connecting together all of the interconnect chips 102 of each super node 104. A plurality of distance links (D-links) 108, or as shown eight D-links 108 connect together the example nine super nodes 104 together in the same position in each of the other chassis pairs. Each of the L-links 106 and D-links 108 comprises a bi-directional (×2) high-speed serial (HSS) link.

Figure 1B:
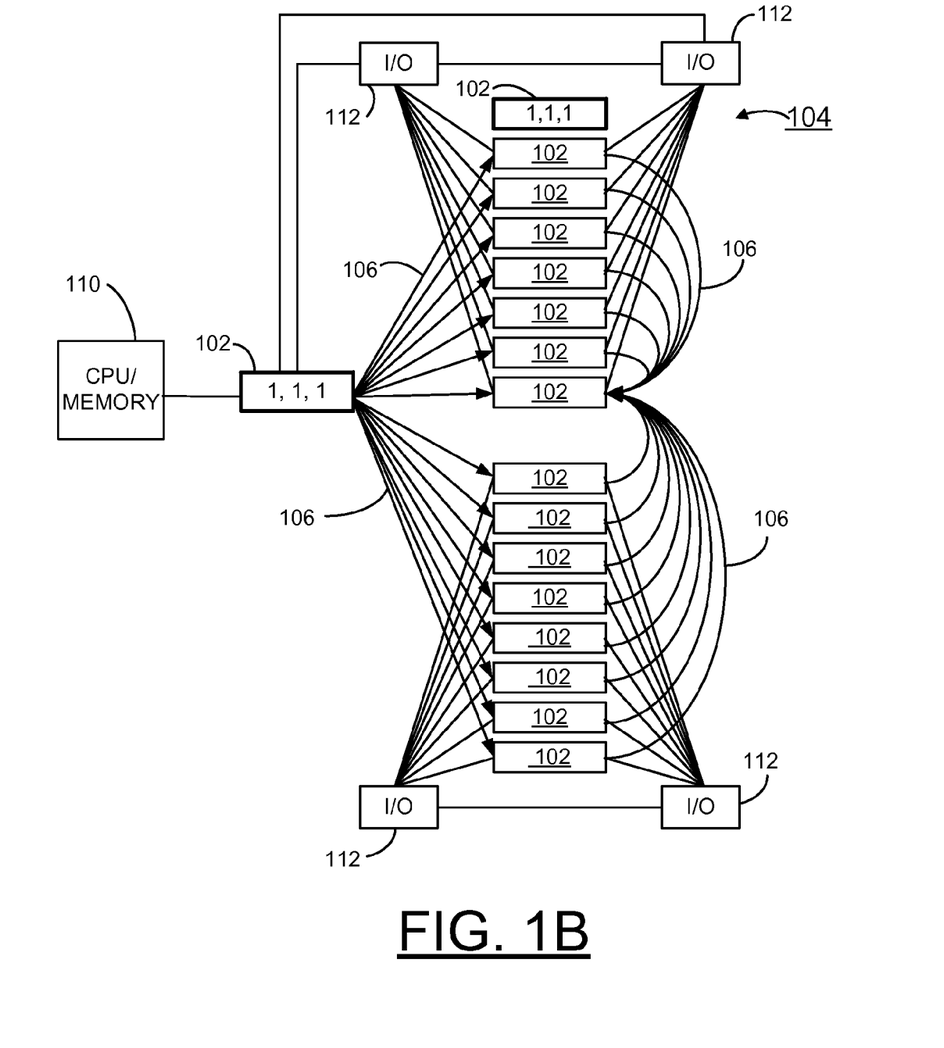
Figure 1C:
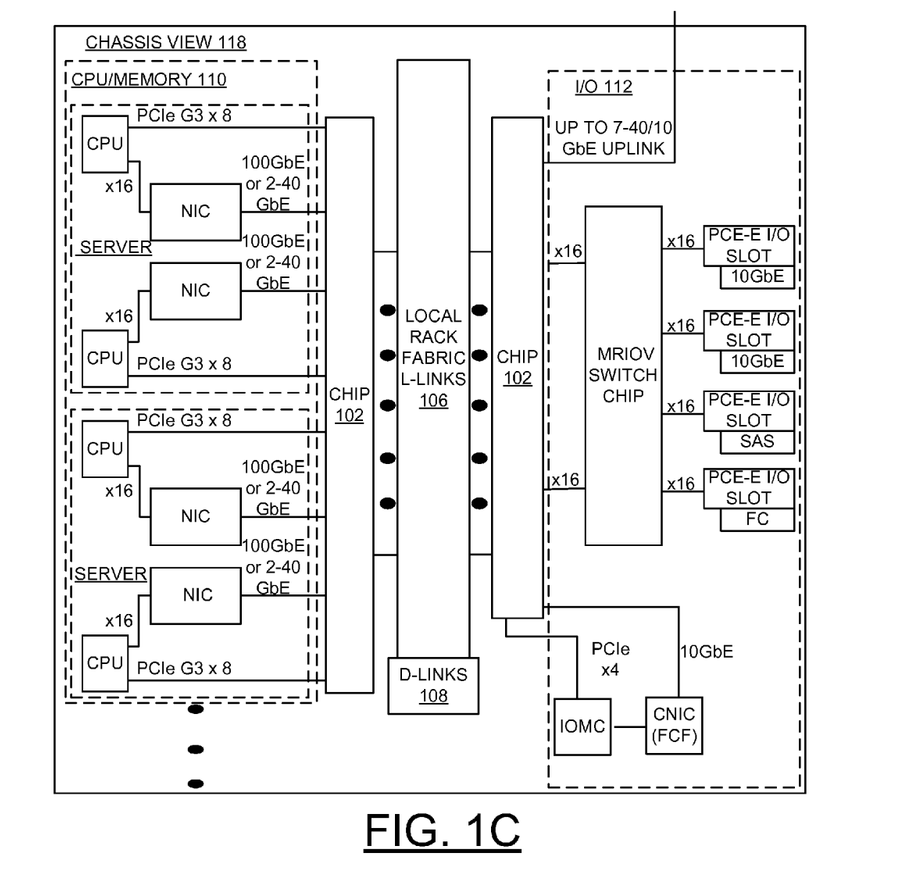
Figure 1D:
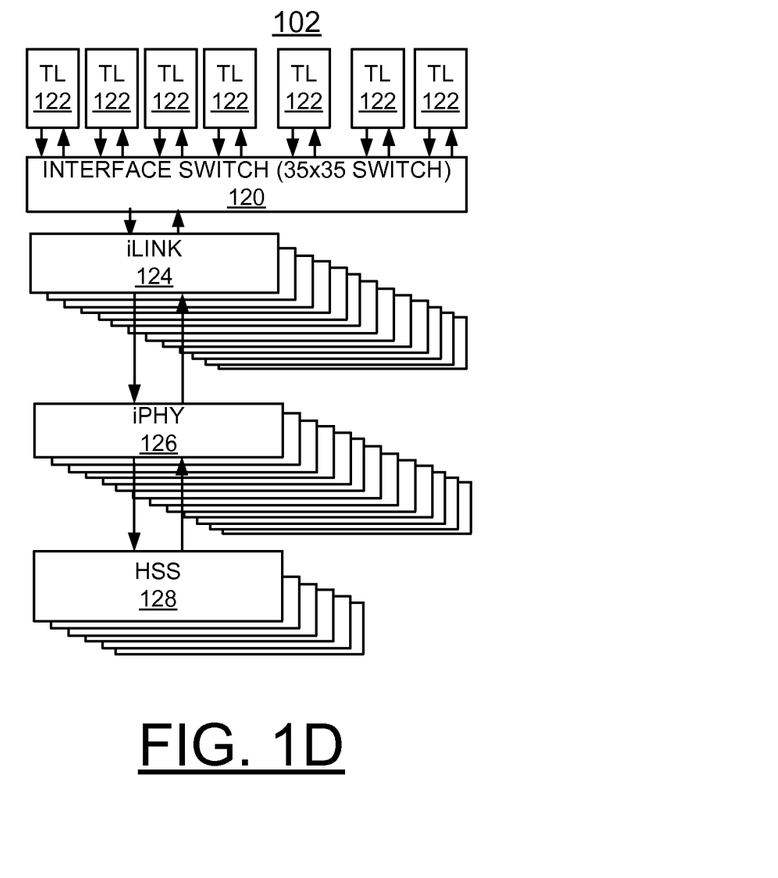
Figure 1E:
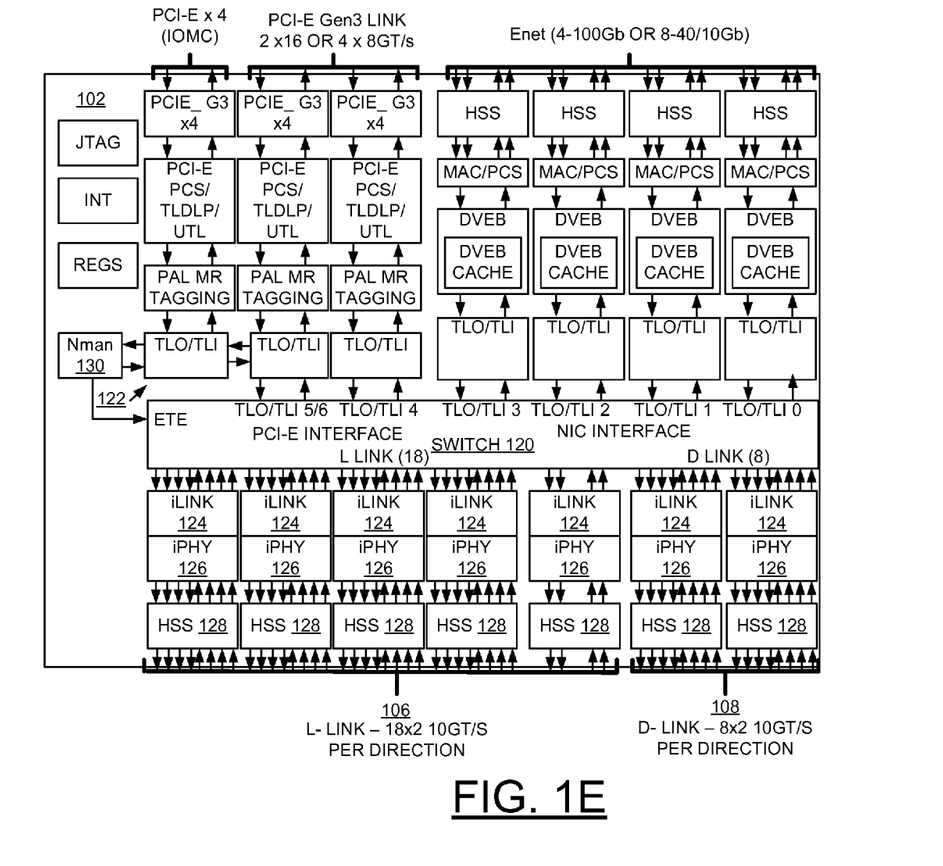

Referring also to FIG. 1E, each of the interconnect chips 102 of FIG. 1A includes, for example, 18 L-links 106, labeled 18 ×2 10 GT/S PER DIRECTION and 8 D-links 108, labeled 8 ×2 10 GT/S PER DIRECTION.

Referring also to FIGS. 1B and 1C, multiple interconnect chips 102 defining a super node 104 are shown connected together in FIG. 1B. A first or top of stack interconnect chip 102, labeled 1,1,1 is shown twice in FIG. 1B, once off to the side and once on the top of the stack. Connections are shown to the illustrated interconnect chip 102, labeled 1,1,1 positioned on the side of the super node 104 including a plurality of L-links 106 and a connection to a device 110, such as a central processor unit (CPU)/memory 110. A plurality of D links 108 or eight D-links 108 as shown in FIG. 1A, (not shown in FIG. 1B) are connected to the interconnect chips 102, such as interconnect chip 102, labeled 1,1,1 in FIG. 1B.

As shown in FIG. 1B, each of a plurality of input/output (I/O) blocks 112, is connected to respective interconnect chips 102, and respective ones of the I/O 112 are connected together. A source interconnect chip 102, such as interconnect chip 102, labeled 1,1,1 transmits or sprays all data traffic across all L-links 106. A local 110 112 may also use a particular L-link 106 of destination I/O 112. For a destination inside a super node 104, or chassis pair of first and second chassis group 105, a source interconnect chip or an intermediate interconnect chip 102 forwards packets directly to a destination interconnect chip 102 over an L-link 106. For a destination outside a super node 104, a source interconnect chip or an intermediate interconnect chip 102 forwards packets to an interconnect chip 102 in the same position on the destination super node 104 over a D-link 108. The interconnect chip 102 in the same position on the destination super node 104 forwards packets directly to a destination interconnect chip 102 over an L-link 106.

In the multiple-path local rack interconnect system 100, the possible routing paths with the source and destination interconnect chips 102 within the same super node 104 include a single L-link 106; or a pair of L-links 106. The possible routing paths with the source and destination interconnect chips 102 within different super nodes 104 include a single D-link 108 (D); or a single D-link 108, and a single L-link 106 (D-L); or a single L-link 106, and single D-link 108 (L-D); or a single L-link 106, a single D-link 108, and a single L-link 106 (L-D-L). With an unpopulated interconnect chip 102 or a failing path, the L-link 106 is removed from a spray list at the source interconnect 102.

As shown in FIGS. 1B and 1C, a direct path is provided from the central processor unit (CPU)/memory 110 to the interconnect chips 102, such as chip 102, labeled 1,1,1 in FIG. 1B, and from any other CPU/memory connected to another respective interconnect chip 102 within the super node 104.

Referring now to FIG. 1C, a chassis view generally designated by the reference character 118 is shown with a first of a pair of interconnect chips 102 connected a central processor unit (CPU)/memory 110 and the other interconnect chip 102 connected to input/output (I/O) 112 connected by local rack fabric L-links 106, and D-links 108. Example connections shown between each of an illustrated pair of servers within the CPU/memory 110 and the first interconnect chip 102 include a Peripheral Component Interconnect Express (PCIe) G3 ×8, and a pair of 100 GbE or 2-40 GbE to a respective Network Interface Card (NIC). Example connections of the other interconnect chip 102 include up to 7-40/10 GbE Uplinks, and example connections shown to the I/O 112 include a pair of PCIe G3 ×16 to an external MRIOV switch chip, with four ×16 to PCI-E I/O Slots with two Ethernet slots indicated 10 GbE, and two storage slots indicated as SAS (serial attached SCSI) and FC (fibre channel), a PCIe ×4 to a IOMC and 10 GbE to CNIC (FCF).

Referring now to FIGS. 1D and 1E, there are shown block diagram representations illustrating an example interconnect chip 102. The interconnect chip 102 includes an interface switch 120 connecting a plurality of transport layers (TL) 122, such as 7 TLs, and interface links (iLink) layer 124 or 26 iLinks. An interface physical layer protocol, or iPhy 126 is coupled between the interface links layer iLink 124 and high speed serial (HSS) interface 128, such as 7 HSS 128. As shown in FIG. 1E, the 7 HSS 128 are respectively connected to the illustrated 18 L-links 106, and 8 D-links 108. In the example implementation of interconnect chip 102, 26 connections including the illustrated 18 L-links 106, and 8 D-links 108 to the 7 HSS 128 are used, while the 7 HSS 128 would support 28 connections.

The TLs 122 provide reliable transport of packets, including recovering from broken chips 102 and broken links 106, 108 in the path between source and destination. For example, the interface switch 120 connects the 7 TLs 122 and the 26 iLinks 124 in a crossbar switch, providing receive buffering for iLink packets and minimal buffering for the local rack interconnect packets from the TLO 122. The packets from the TL 122 are sprayed onto multiple links by interface switch 120 to achieve higher bandwidth. The iLink layer protocol 124 handles link level flow control, error checking CRC generating and checking, and link level retransmission in the event of CRC errors. The iPhy layer protocol 126 handles training sequences, lane alignment, and scrambling and descrambling. The HSS 128, for example, are 7 ×8 full duplex cores providing the illustrated 26 ×2 lanes.

In FIG. 1E, a more detailed block diagram representation illustrating the example interconnect chip 102 is shown. Each of the 7 transport layers (TLs) 122 includes a transport layer out (TLO) partition and transport layer in (TLI) partition. The TLO/TLI 122 respectively receives and sends local rack interconnect packets from and to the illustrated Ethernet (Enet), and the Peripheral Component Interconnect Express (PCI-E), PCI-E ×4, PCI-3 Gen3 Link respectively via network adapter or fabric adapter, as illustrated by blocks labeled high speed serial (HSS), media access control/physical coding sub-layer (MAC/PCS), distributed virtual Ethernet bridge (DVEB); and the PCIE_G3 ×4, and PCIE_G3 2 ×8, PCIE_G3 2 ×8, a Peripheral Component Interconnect Express (PCIe) Physical Coding Sub-layer (PCS) Transaction Layer/Data/Link Protocol (TLDLP) Upper Transaction Layer (UTL), PCIe Application Layer (PAL MR) TAGGING to and from the interconnect switch 120. A network manager (NMan) 130 coupled to interface switch 120 uses End-to-End (ETE) small control packets for network management and control functions in multiple-path local rack interconnect system 100. The interconnect chip 102 includes JTAG, Interrupt Handler (INT), and Register partition (REGS) functions.

In accordance with features of the invention, a protocol method and circuit are provided for initializing the scrambling and descrambling Linear Feedback Shift Registers (LFSRs) in order to guarantee that multiple instances of the same interface on a given chip 102 are using different values at any given time. Each transmit LFSR is initialized to a unique value during power-on, starts running performing shifting operations, and continues to do so (non-stop) during the life of that power-on.

Figure 2:
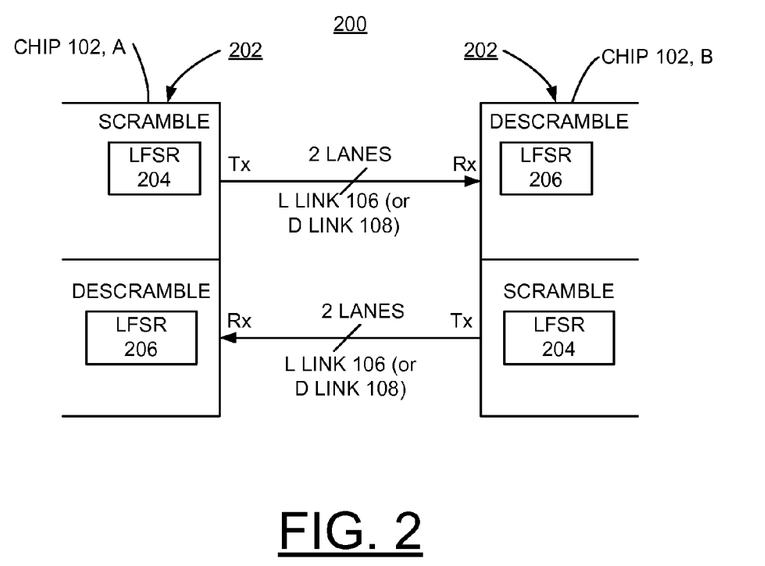
FIG. 2 illustrates a single high speed serial link circuit including Linear Feedback Shift Registers (LFSRs) of the interconnect chip of FIGS. 1A-1E in accordance with the preferred embodiment.

Referring now to FIG. 2, there is shown a single high speed serial link circuit generally designated by the reference character 200 for implementing known scrambling relationship among multiple serial links in accordance with the preferred embodiment. The single high speed serial link circuit 200 includes a respective HSS interface circuit designated by the reference character 202 included in each interconnect chip 102, A and B connected by L-link 106 or D-link 108. The HSS interface circuit 202 includes a respective transmit or scrambling Linear Feedback Shift Register (LFSR) 204 coupled to the transmit side of an L link 106 or a D link 108 of the high speed serial link circuit 200. The HSS interface circuit 202 includes a respective descrambling Linear Feedback Shift Register (LFSR) 206 coupled to a receive side of the L link 106 or the D link 108 of the high speed serial link circuit 200.

The high speed serial (HSS) link circuit 200 is implemented in the HSS interface 128 of the interconnect chip 102 shown in FIGS. 1D and 1E.

Figure 3:
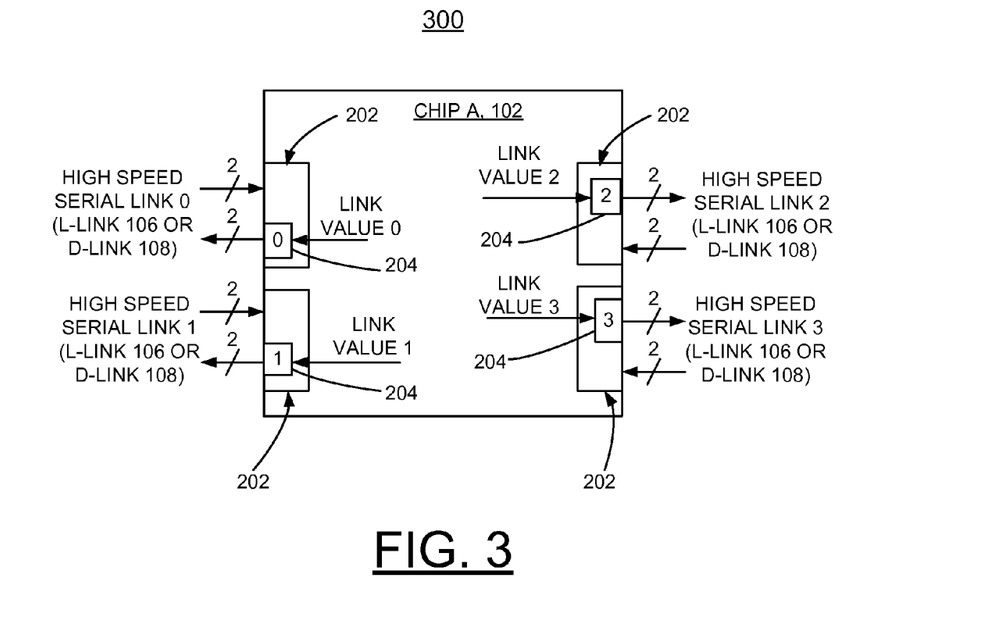
FIG. 3 illustrates multiple instances of the high speed serial link circuit of FIG. 2 for implementing known scrambling relationship among multiple serial links in accordance with the preferred embodiment.

FIG. 3 illustrates multiple instances generally designated by the reference character 300 of the high speed serial interface circuit 202 of FIG. 2 for implementing known scrambling relationship among multiple serial links in accordance with the preferred embodiment. The respective transmit or scrambling Linear Feedback Shift Register (LFSR) 204 of each of the multiple link interface circuits 202 receives a unique value indicated by arrows labeled LINK VALUE 0-3. The unique value applied to the respective transmit LFSR 204 is based, for example, upon an interface number of each said transmit LFSR. Each of the transmit LFSRs 204 is initialized to the unique value during power-on, then continues running generally for the life of the power-on. Each of the transmit LFSRs 204 also would be initialized to the unique value during a reboot or reset of the interconnect chips 102 of the multiple-path local rack interconnect system 100. Each transmit LFSR 204 conveys a current unique value to a receive LFSR 206 for synchronizing the transmit LFSR and receive LFSR during a link training sequence.

Figure 4:
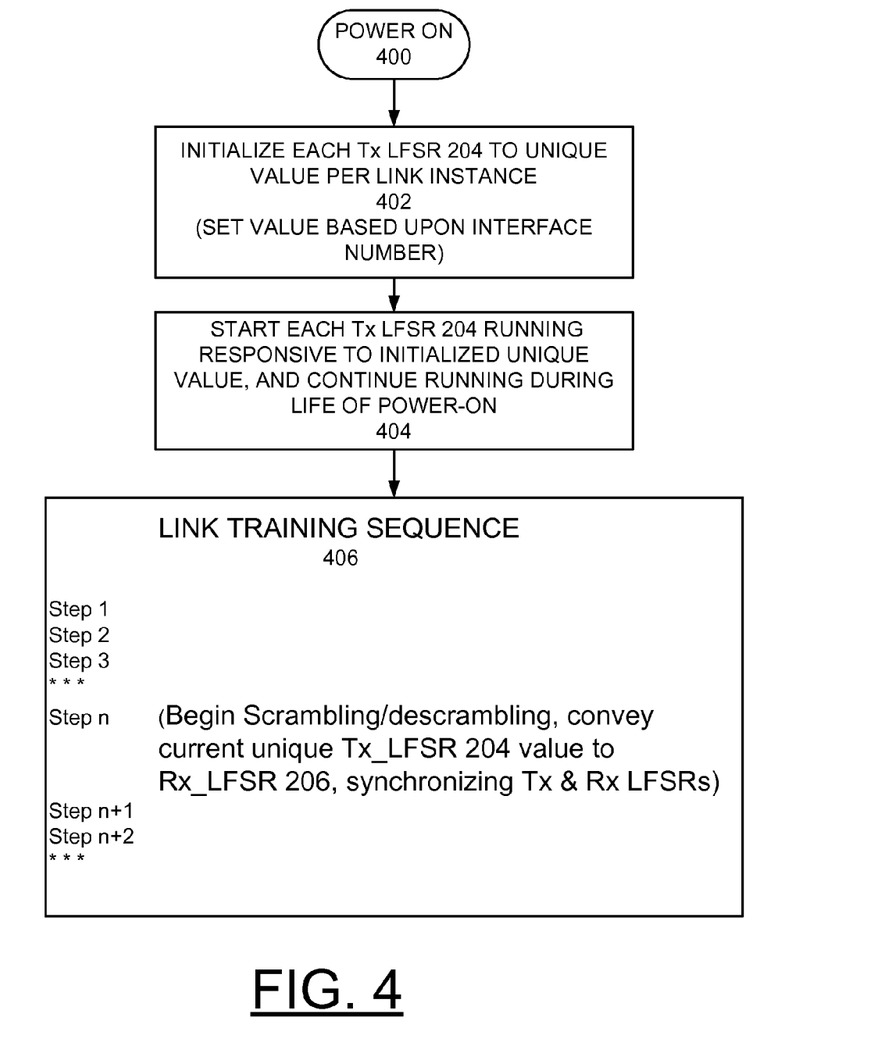
FIG. 4 is a flow chart illustrating exemplary operations performed by the high speed serial link circuits of FIGS. 2 and 3 for implementing known scrambling relationship among multiple serial links in accordance with the preferred embodiment.

Referring now to FIG. 4, there are shown exemplary operations performed by the high speed serial link circuits 200, 300 of FIGS. 2 and 3 for implementing known scrambling relationship among multiple serial links in accordance with the preferred embodiment starting at power-on as indicated at a block 400. Each of the transmit LFSRs 204 is initialized to the unique value during power-on as indicated at a block 402, the unique value advantageously is based upon the interface number. The transmit LFSRs 204 are initialized or programmed using a selected mechanism, for examples, by scanning in or loading a register value, or by wiring pins on the chip 102 to Vdd or ground. Each of the transmit LFSRs 204 starts running responsive to the initialized unique value, and continues running for the life of the power-on as indicated at a block 404.

Next as indicated at a block 406 a link training sequence is performed to initialize or train each of the high speed serial links in the multiple-path local rack interconnect system 100. As shown at step number n during the link training sequence, the transmit LFSR 204 conveys a current unique value to a receive LFSR 206 for synchronizing the transmit LFSR and receive LFSR. Then the descrambling LFSR 206 at the receiver interconnect chip 102 is synchronized with the scrambling LFSR 204 at the transmitter interconnect chip 102 so that the bit stream may be accurately descrambled.

Figure 5:
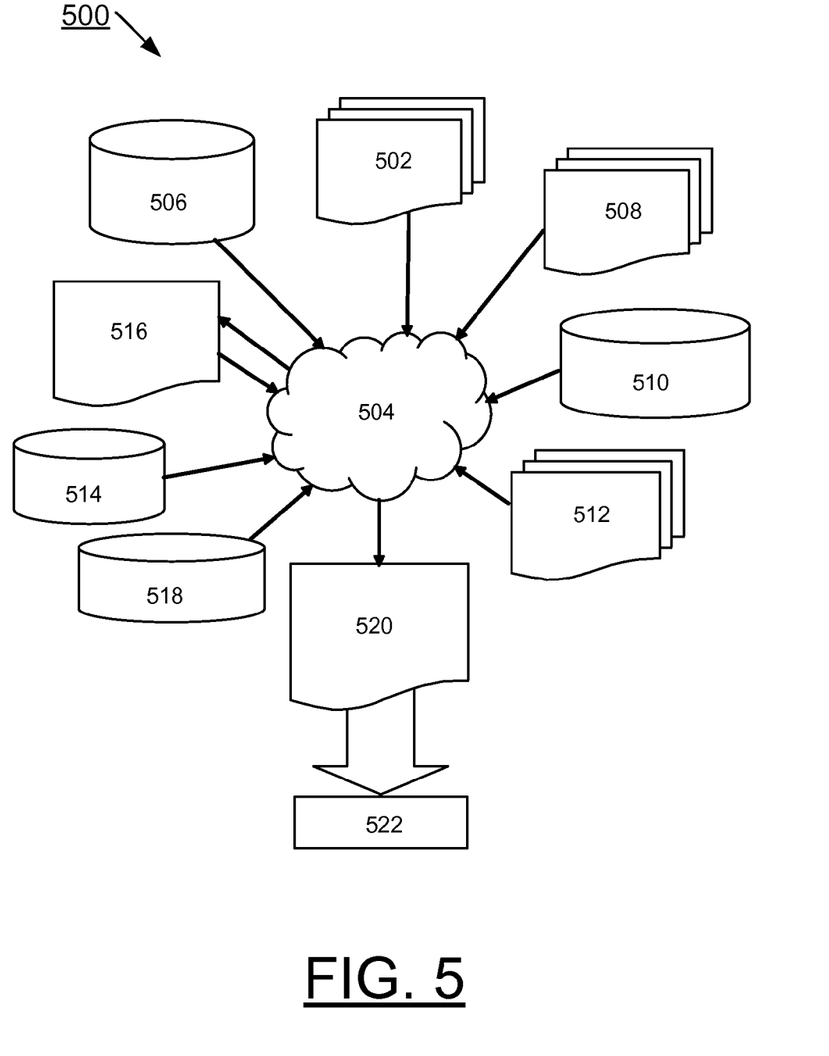
FIG. 5 is a flow diagram of a design process used in semiconductor design, manufacturing, and/or test.

FIG. 5 shows a block diagram of an example design flow 500 that may be used for high speed serial link circuit and the interconnect chip described herein. Design flow 500 may vary depending on the type of IC being designed. For example, a design flow 500 for building an application specific IC (ASIC) may differ from a design flow 500 for designing a standard component. Design structure 502 is preferably an input to a design process 504 and may come from an IP provider, a core developer, or other design company or may be generated by the operator of the design flow, or from other sources. Design structure 502 comprises circuits 102, 200, 300 in the form of schematics or HDL, a hardware-description language, for example, Verilog, VHDL, C, and the like. Design structure 502 may be contained on one or more machine readable medium. For example, design structure 502 may be a text file or a graphical representation of circuits 102, 200, 300. Design process 504 preferably synthesizes, or translates, circuits 102, 200, 300 into a netlist 506, where netlist 506 is, for example, a list of wires, transistors, logic gates, control circuits, I/O, models, etc. that describes the connections to other elements and circuits in an integrated circuit design and recorded on at least one of machine readable medium. This may be an iterative process in which netlist 506 is resynthesized one or more times depending on design specifications and parameters for the circuits.

Design process 504 may include using a variety of inputs; for example, inputs from library elements 508 which may house a set of commonly used elements, circuits, and devices, including models, layouts, and symbolic representations, for a given manufacturing technology, such as different technology nodes, 32 nm, 45 nm, 90 nm, and the like, design specifications 510, characterization data 512, verification data 514, design rules 516, and test data files 518, which may include test patterns and other testing information. Design process 504 may further include, for example, standard circuit design processes such as timing analysis, verification, design rule checking, place and route operations, and the like. One of ordinary skill in the art of integrated circuit design can appreciate the extent of possible electronic design automation tools and applications used in design process 504 without deviating from the scope and spirit of the invention. The design structure of the invention is not limited to any specific design flow.

Design process 504 preferably translates an embodiment of the invention as shown in FIGS. 1A-1E, and 2-4 along with any additional integrated circuit design or data (if applicable), into a second design structure 520. Design structure 520 resides on a storage medium in a data format used for the exchange of layout data of integrated circuits, for example, information stored in a GDSII (GDS2), GL1, OASIS, or any other suitable format for storing such design structures. Design structure 520 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1A-1E, and 2-4. Design structure 520 may then proceed to a stage 522 where, for example, design structure 520 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A method for implementing known scrambling relationship among multiple serial links comprising:
   providing a transmit Linear Feedback Shift Register (LFSR) with each of the multiple serial links for scrambling transmitted data;
   providing a receive Linear Feedback Shift Register (LFSR) with each of the multiple serial links for descrambling transmitted data;
   initializing each said transmit LFSR with a respective unique value per link instance during power-on of the multiple serial links, each said transmit LFSR starts running responsive to said respective initialized unique value per link instance, and continues running during life of the power-on; each said respective initialized unique value per link instance being different from one another and substantially without adding of EMI radiation of each link; and
   performing a link training sequence to initialize each of the multiple serial links, said link training sequence including each said transmit LFSR, conveying said current unique value per link instance to a receive LFSR, for synchronizing said transmit LFSR and said receive LFSR to begin scrambling data; each said respective current unique value per link instance being different from one another for each said transmit LFSR.

2. The method for implementing known scrambling relationship among multiple serial links as recited in claim 1 wherein initializing each said transmit LFSR with a unique value includes setting said unique value based upon an interface number of each said transmit LFSR.

3. A circuit for implementing known scrambling relationship among multiple serial links comprising:
   a respective link interface coupled to each of the multiple serial links, each said link interface including a transmit Linear Feedback Shift Register (LFSR) for scrambling transmitted data; and a receive Linear Feedback Shift Register (LFSR) with each of the multiple serial links for descrambling transmitted data;
   each said transmit LFSR being initialized with a respective unique value per link instance during power-on of the multiple serial links, each said transmit LFSR starts running responsive to said respective initialized unique value per link instance, and continues running during life of the power-on; each said respective initialized unique value per link instance being different from one another and substantially without adding of EMI radiation of each link; and
   each said transmit LFSR, performing a link training sequence to initialize each of the multiple serial links, said link training sequence including conveying a current unique value per link instance to a receive LFSR, for synchronizing said transmit LFSR and said receive LFSR to begin scrambling data; each said respective current unique value per link instance being different from one another for each said transmit LFSR.

4. The circuit for implementing known scrambling relationship among multiple serial links as recited in claim 3 wherein said unique value is based upon an interface number of each said transmit LFSR.

5. A multiple-path local rack interconnect system comprising:
   a plurality of interconnect chips;
   a plurality of serial links connected between each of said plurality of interconnect chips;
   each of said interconnect chips including a plurality of link interfaces for implementing known scrambling relationship among multiple serial links of said plurality of serial links,
   each said link interface being connected to a respective one of the multiple serial links, each said link interface including a transmit Linear Feedback Shift Register (LFSR) for scrambling transmitted data; and a receive Linear Feedback Shift Register (LFSR) for descrambling transmitted data;
   each said transmit LFSR being initialized with a respective unique value per link instance during power-on of the multiple serial links, each said transmit LFSR starts running responsive to said respective initialized unique value per link instance, and continues running during life of the power-on; each said respective initialized unique value per link instance being different from one another and substantially without adding of EMI radiation of each link; and
   each said transmit LFSR performing a link training sequence to initialize each of the multiple serial links, said link training sequence including each said transmit LFSR conveying a respective current unique value per link instance to a receive LFSR for synchronizing said transmit LFSR and said receive LFSR to begin scrambling data; each said respective current unique value per link instance being different from one another for each said transmit LFSR.

6. The multiple-path local rack interconnect system as recited in claim 5 wherein said unique value is based upon an interface number of each said transmit LFSR.

7. A design structure embodied in a machine readable medium used in a design process, the design structure comprising:
   a circuit tangibly embodied in the machine readable medium used in the design process, said circuit for implementing known scrambling relationship among multiple serial links, said circuit comprising:
   a respective link interface coupled to each of the multiple serial links, each said link interface including a transmit Linear Feedback Shift Register (LFSR) for scrambling transmitted data; and a receive Linear Feedback Shift Register (LFSR) with each of the multiple serial links for descrambling transmitted data;
   each said transmit LFSR being initialized with a respective unique value per link instance during power-on of the multiple serial links, each said transmit LFSR starts running responsive to said respective initialized unique value per link instance, and continues running during life of the power-on; each said respective initialized unique value per link instance being different from one another and substantially without adding of EMI radiation of each link; and
   each said transmit LFSR performing a link training sequence to initialize each of the multiple serial links, said link training sequence including each said transmit LFSR, conveying a respective current unique value per link instance to a receive LFSR, for synchronizing said transmit LFSR and said receive LFSR to begin scrambling data; each said respective current unique value per link instance being different from one another for each said transmit LFSR, wherein the design structure, when read and used in the manufacture of a semiconductor chip produces a chip comprising said circuit.

8. The design structure of claim 7, wherein the design structure comprises a netlist, which describes said circuit.

9. The design structure of claim 7, wherein the design structure resides on storage medium as a data format used for the exchange of layout data of integrated circuits.

10. The design structure of claim 7, wherein the design structure includes at least one of test data files, characterization data, verification data, or design specifications.

11. The design structure of claim 7, wherein said unique value is based upon an interface number of each said transmit LFSR.

* * * * *